United States Patent [19]

Herrington

[11] Patent Number: 4,714,454
[45] Date of Patent: Dec. 22, 1987

[54] APPARATUS FOR PRODUCING MACHINE-DIRECTION HEAT SEALS

[75] Inventor: Fox J. Herrington, Holcomb, N.Y.

[73] Assignee: Mobil Oil Corporation, New York, N.Y.

[21] Appl. No.: 904,445

[22] Filed: Sep. 8, 1986

[51] Int. Cl.⁴ .................. B31B 23/64; B31B 23/86
[52] U.S. Cl. ........................ 493/193; 493/208; 493/225; 493/394; 493/928; 156/583.1; 156/583.4
[58] Field of Search ............ 493/205, 206, 207, 208, 493/209, 189, 190, 191, 192, 193, 197, 202, 225, 226, 381, 386, 394, 406, 470, 471, 928; 156/582, 583.1, 583.4, 583.7, 583.8, 583.9, 583.91

[56] References Cited

U.S. PATENT DOCUMENTS

| | | | |
|---|---|---|---|
| 2,242,799 | 5/1941 | Moore | 493/208 |
| 2,762,420 | 9/1956 | Stanton | 156/583.1 |
| 2,897,729 | 8/1959 | Ashton et al. | 493/196 |
| 2,971,874 | 2/1961 | Canno | 493/197 |
| 2,998,842 | 9/1961 | Good | 156/583.4 |
| 3,029,853 | 4/1962 | Piazze | 383/75 |
| 3,058,402 | 10/1962 | Kugler | 493/196 |
| 3,058,403 | 10/1962 | Kugler | 493/194 |
| 3,406,610 | 10/1968 | Golden | 493/196 |
| 3,414,032 | 12/1968 | Jortikka | 383/26 |
| 3,484,325 | 12/1969 | Pendleton | 156/583.4 |
| 3,759,772 | 9/1973 | Andersson | 156/270 |
| 4,140,046 | 2/1979 | Marbach | 493/209 |
| 4,202,721 | 5/1980 | Roberts | 156/358 |
| 4,308,087 | 12/1981 | Johnson | 493/197 |

FOREIGN PATENT DOCUMENTS

| | | |
|---|---|---|
| 2732085 | 1/1979 | Fed. Rep. of Germany ... 156/583.1 |
| 2833119 | 2/1980 | Fed. Rep. of Germany ... 156/583.1 |
| 1125363 | 8/1968 | United Kingdom . |

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

Apparatus for heat sealing a pair of hems in a moving web of film having structure including a pair of spaced surfaces over which each hem of the pair of hems is adapted to pass. A first block is supported by the structure with respect to one of the surfaces and on one side of one of the hems. A plurality of rollers is mounted on the first block at spaced locations in tandem for engaging the film along the path of the heat seal to be formed in the one hem. A second block is supported by the structure with respect to the other of the surfaces and on one side of the second hem. The second block has a plurality of rollers mounted thereon at spaced locations in tandem for engaging the film along the path of a heat seal to be formed in the second hem. Heaters are provided for each of the blocks and the respective plurality of rollers whereby movement of the hems through the heat sealing apparatus causes the plurality of rollers mounted on the blocks to rotate and produce the heat seals in the pair of hems. Mounted on the structure between the pair of hems is a plurality of back-up rollers for engaging the film along the path of the heat seals to be formed in the hems and cooperating with the heated rollers on the blocks in creating the heat seals in the pair of hems.

6 Claims, 4 Drawing Figures

APPARATUS FOR PRODUCING MACHINE-DIRECTION HEAT SEALS

BACKGROUND OF THE INVENTION

This invention relates to apparatus producing machine-direction heat seals for sealing a pair of hems in a moving web of film and more particularly to the manufacture of draw tape plastic bags.

Bags made of thin polyethylene materials have been used in various sizes. Small bags are used in the packaging of samples and the like. Larger bags are used as shopping bags; and even larger bags are used for containing trash.

A particularly advantageous closure for such a bag includes a draw tape constructed from the same polyethylene material. U.S. Pat. No. 3,029,853—Piazzi and British patent No. 1,125,363—Jortikka are examples of draw tape bags. Such closures have been successfully employed on these bags.

Draw tape closures for large trash bags, and the manufacture of these draw tape trash bags, are described in the related applications identified below.

Forming the hem, into which the tape is inserted, is shown for example, in U.S. Pat. Nos. 2,897,729—Ashton et al 3,058,402—Kugler, 3,058,403—Kugler, and in copending patent applications of applicant's assignee including "METHOD AND APPARATUS FOR FORMING HEMS IN SUPERPOSED PLIABLE PANELS", Boyd et al, Ser. No. 625,255, filed Sept. 20, 1984, now U.S. Pat. No. 4,617,008, and in "HEM FOLDER WITH INTEGRAL TAPE INSERTER FOR MAKING DRAW TAPE BAGS," Herrington, Ser. No. 871,238 filed June 6, 1986.

Draw tape hems have been previously made by various methods. One method is to use a Teflon-coated hot bar which opens and closes against the film in the area of the bag machine where the film starts and stops. The bar closes once during each cycle while the film is stopped. A second method is to blow a series of hot air jets against the film as it travels by. Bag closures for use in the field use a pair of heated belts to produce a machine-direction seal. In the hot bar method, the hot bar is located far downstream from where the tape is inserted into the hem and also where the hem is folded, so there has been an opportunity for the tape and the hem to wander by the time it reaches the sealer. This requires making the hem wider to allow for this wandering movement. This is costly in wasted material, produces a weak tape seal at the side edges of the bag, and also makes a sloppy bag. The hot air sealer can be used on a continuously moving web, but it is very sensitive to wrinkles. The heating of the film by the air jets also causes some wrinkling which cannot easily be prevented since the film is not mechanically constrained. As a result the hem seals made by these techniques are not reliable, particularly where thin films, in the order of one mil, are used.

It is an object of the present invention to seal a pair of hems in a web of film moving at a relatively high speed, such as 250-300 ft./min, where the seal in the hem is produced close to where the hem is folded and the tape inserted but after the hem leaves the folding surface.

It is a further object of the present invention to seal hems in the opposing panels of a moving web of folded thermoplastic film in the manufacture of draw tape bags.

RELATED APPLICATIONS

METHOD AND APPARATUS FOR MANUFACTURING DRAW TAPE BAGS, Boyd, et al, Ser. No. 652,254, filed Sept. 20, 1984, now U.S. Pat. No. 4,624,654, describes an overall draw tape bag manufacturing line; METHOD AND APPARATUS FOR FORMING HEMS IN SUPERPOSED PLIABLE PANELS, Boyd et al, Ser. No. 652,255, filed Sept. 20, 1984, now U.S. Pat. No. 4,617,008, describes a hem forming apparatus used with the line; INSERTION OF DRAW TAPE STRIPS IN DRAW TAPE BAG MANUFACTURE, Boyd et al, Ser. No. 652,252, filed Sept. 20, 1984, now U.S. Pat. No. 4,597,750, describes apparatus for inserting a draw tape into the bag; HEM FOLDER WITH INTEGRAL TAPE INSERTER FOR MAKING DRAW TAPES, Herrington, Ser. No. 871,238 filed June 6, 1986, describes apparatus for folding a hem and inserting a draw tape into the bag; APPARATUS FOR SEALING A HEM IN A MOVING WEB OF FILM USING ANGULARLY ORIENTED HOT WHEELS, Herrington et al, Ser. No. 904,449 filed concurrently herewith; APPARATUS FOR SEALING A HEM IN A MOVING WEB OF FILM, Herrington, Ser. No. 904,441 filed concurrently herewith and APPARATUS FOR PRODUCING A MACHINE-DIRECTION HEAT SEAL, Herrington, Ser. No. 904,444 filed concurrently herewith.

SUMMARY OF THE INVENTION

The present invention is directed to a machine for making bags from thermoplastic film and particularly to apparatus for heat sealing a pair of hems in a moving web of film. The apparatus comprises structure including a pair of spaced surfaces over which each hem of the pair of hems is adapted to pass. A first block is supported by the structure with respect to one of the surfaces and on one side of one of the hems. A plurality of rollers is mounted on the first block at spaced locations in tandem for engaging the film along the path of the heat seal to be formed in the one hem. A second block is supported by the structure with respect to the other one of the surfaces and on one side of the second hem, the second block has a plurality of rollers mounted thereon at spaced locations in tandem for engaging the film along the path of a heat seal to be formed in the second hem. Means are provided for heating each of the blocks and the respective plurality of rollers whereby movement of the hems through the heat sealing apparatus causes the plurality of rollers mounted on the blocks to rotate and produce the heat seals in the pair of hems. Supported by the structure between the pair of hems is a plurality of back-up rollers cooperating with the plurality of heated rollers on the blocks for producing the heat seals in the pair of hems. The back-up rollers preferably are alternated so that every other back-up roller is used as the back-up for the heated rollers sealing the hem on the front of the bag and the alternate back-up rollers are used for the back-up of the heated rollers sealing the hem on the back of the bag to minimize the separation distance between the pair of hems during the heat sealing operation. In the preferred form of the invention, the apparatus includes an elongated wedge having a front surface and a back surface comprising a pair of spaced surfaces over which the pair of hems is adapted to pass.

The foregoing and other objects, features and advantages of the invention will be better understood from the following, more detailed description and apended claims.

SHORT DESCRIPTION OF THE DRAWINGS

DESCRIPTION OF SPECIFIC EMBODIMENTS

The present invention is particularly related to the manufacture of draw tape bags formed from an extruded tube of polyethylene. The tube is slit along one side to form open tops in the bag for reception of trash and the like. The tube of film is folded along the other side to form the bag bottoms. The sides of the panels are heat sealed and cut from the tube in a perpendicular direction to form individual bags.

Hemmed portions of each opposing panel are folded over adjacent tops. The draw tape bag construction as thus far described is similar to the draw tape bags disclosed in copending application Ser. No. 871,238.

Figure 1:
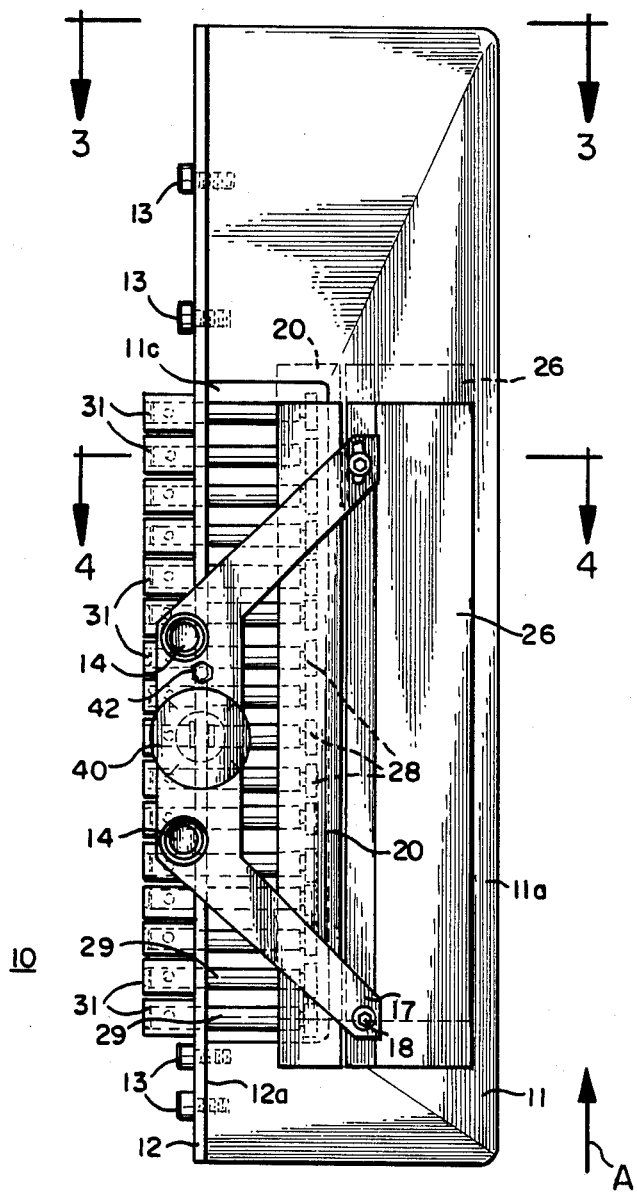
FIG. 1 is an elevation view of a hem sealing apparatus embodying the present invention.
Figure 2:
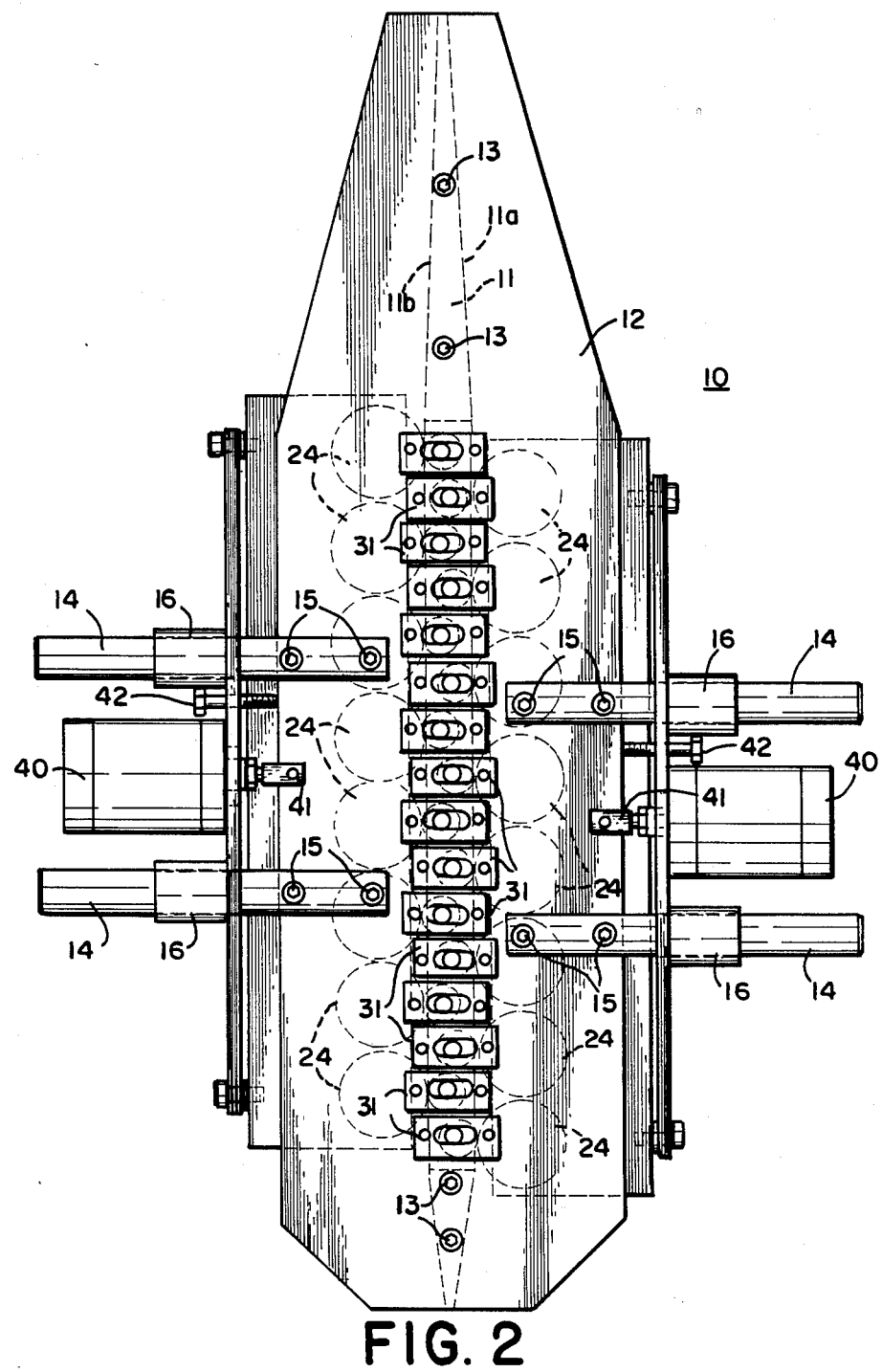
FIG. 2 is a side elevation taken from the left hand side of FIG. 1 of the hem sealing apparatus embodying the present invention.
Figure 3:
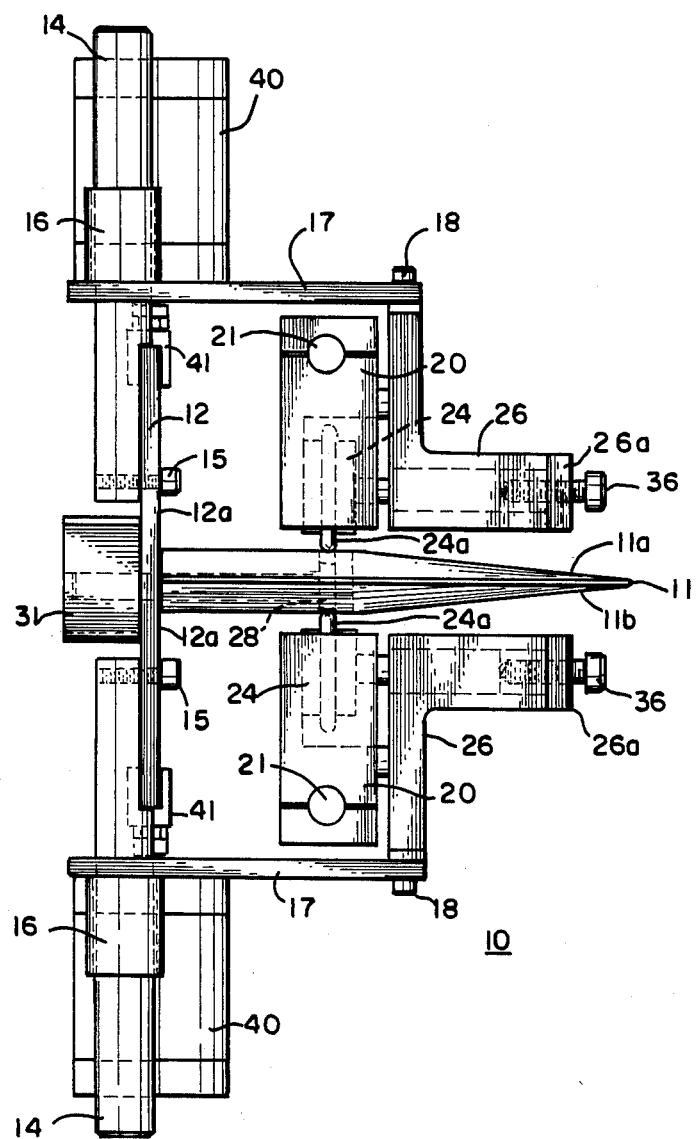
FIG. 3 is an end view taken along the lines 3—3 in FIG. 1 of the hem sealing apparatus embodying the present invention and FIG. 4 is a sectional view taken along the lines 4—4 in FIG. 1.
Figure 4:
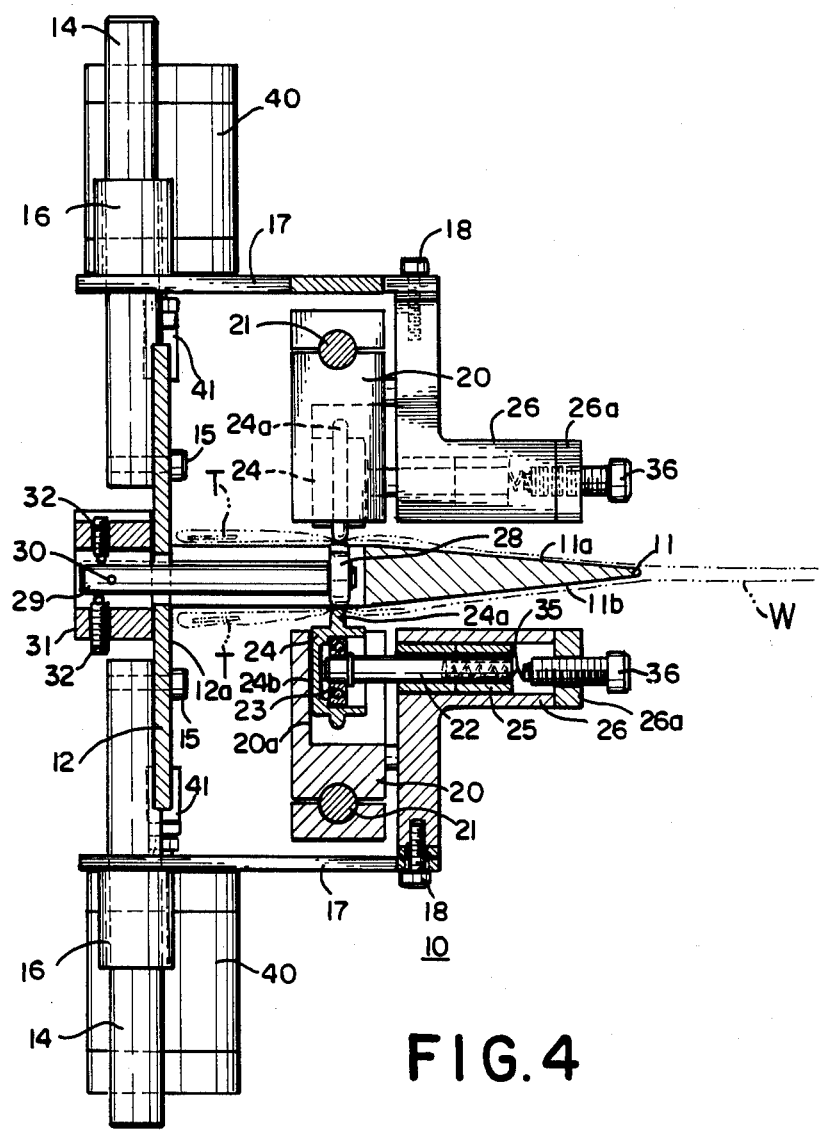

FIGS. 1-4 illustrate a hem sealing apparatus 10 embodying the present invention for sealing a hem in a moving web of film. A moving web of film is formed from an extruded tube of polyethylene which has been slit on one side and folded on the other side to form two opposing layers of film. The slit edges are folded over to form a hem in each edge and a tape is inserted in each hem in a manner well understood in the art. The unsealed hems of the web W with the tapes T therein, as shown in phantom lines in FIG. 4, then move in a upward direction as shown in FIG. 1 by the arrow A over the hem sealing apparatus 10 now to be described. The apparatus 10 includes an elongated wedge 11 which projects perpendicularly from a back plate 12 to which it is secured by a plurality of screws 13. An end view of the wedge shaped member 11 is shown in FIG. 3 and a cross-section of the wedge shaped member 11 is shown in FIG. 4. As may be seen in FIGS. 3 and 4 the wedge shaped member 11 is provided with an upper surface 11a and an lower surface 11b over which the pair of hems in the web W pass. The folded edges of the hems, FIG. 4, are closely adjacent the side 12a of the back plate 12. Thus it will be seen in FIG. 4 that one of the hems with a tape T therein passes over the front surface 11a of the wedge 11 and the other hem with a tape T therein passes over the back surface 11b of the wedge 11.

The hem sealing apparatus 10 is adapted to be supported in fixed position along the path of travel of the hems in the moving web W of film after the web leaves the hem folding and tape inserting portion of the bag making machine. The support for the hem sealing apparatus 10 is provided by the two pairs of shaft 14 which are secured to the opposite sides of the back plate 12 by screws 15. Mounted on the shafts 14 are two pairs of bronze sleeve bearings 16, one pair being welded to each of the supporting brackets 17. The heat sealing apparatus 10 comprises two similar sealing units, one mounted on each of the support members 17 by the screws 18.

The details of the heat sealing apparatus are best seen in FIG. 4 where one of the sealing units is shown in cross section. As may be seen in FIG. 4 the heat sealing apparatus 10 includes a heating block 20 through which extends an electric heating element 21 which preferably is thermostatically controlled to control the temperature of the block 20. The block 20 is provided with a plurality of openings 20a into which extend a corresponding number of shafts 22 on which are mounted ball bearings 23 and on which in turn are mounted metal rollers or wheels 24 adapted to be heated by the block 20. Each of the rollers 24 is provided with an annular projection or rim 24a the purpose of which will be hereinafter described. The shafts 22 are mounted in sleeve bearings 25 within a housing 26 having an end plate 26a. The housing 26 is mounted with respect to the wedge 11 such that the projections 24a on the wheels 24 are in alignment with and extend into a cut-out 11c on the wedge 11. Mounted within the cut-out 11c and in alignment with the plurality of rollers 24 is a plurality of rubber rollers 28 which are spring biased and are adapted to cooperate with the corresponding plurality of heated rollers 24 in heat sealing one of the hem in the web. As may be seen in FIG. 4 the rollers 28 serve as backup rollers for the heated rollers or wheels 24. The backup rollers 28 are mounted on shafts 29 which are carried by pivots 30 which in turn are carried by shaft housings or blocks 31 secured to the back plate 12. The blocks 31 are provided with a pair of spring loaded detents 32 which engage the shafts 29 for the rollers 28. The spring loaded detents 32 are adjustable so as to vary the amount of spring loading on the shafts 29. While the foregoing arrangement has been described in connection with the surface 11b of the wedge 11, it is to be understood that similar parts both for the heated rollers 24 and the rubber back-up rollers 28 are utilized in connection with the other surface 11a of the wedge 11.

As may be seen in FIG. 4 the projections 24a on the heated rollers 24 cooperate with the spring biased rubber rollers 28 and engage the opposite sides of the hem and form a heat seal longitudinally of the web. The wheels 24 are heated by means of conduction from the heater block 20, the temperature of which which is thermostatically controlled by the electric heating element 21. As may be seen in FIG. 4, the shaft 22 is provided with a bore 22a which is adapted to receive a compression spring 35. The end plate 26a has a threaded opening into which extends an adjustable screw 26 which is adapted to engage the end of the compression spring 35. The opposite end of the compression spring 35 engages the shaft 22 at the end of the bore 22a and thus by adjusting the screw 36, the compression spring 35 can likewise be adjusted thereby forcing the shaft 22 in a horizontal direction as viewed in FIG. 4. This causes the wheel 24 to have its flat face 24b maintained in engagement with surface 20a of the heater block 20. The spring 35 maintains the face 24b of the wheel 24 in contact with the heater block 20 thus ensuring heat transfer from the heater block 20 to each wheel 24. The adjustable screws 36 have the advantage of being able to minimize the longitudinal force applied to the shafts 22 while maintaining good thermal contact between the wheels 24 and the heater block 20. The heater block 20 is shaped to provide a housing for the wheels 24 to concentrate the heat around the wheels 24. As may be seen in FIG. 2, eight heated wheels 24 and eight back-up rollers are utilized in sealing each hem. By utilizing a plurality of heat sealing rollers or wheels 24, the heat required for sealing each hem can be delivered to each hem in smaller increments since eight wheels are supplying the heat to each hem rather than one. If only one wheel were being utilized it would be necessary to heat the single wheel to a higher temperature or to operate the speed of the film at a slower speed in order to complete the seal.

As pointed out above both of the heat sealing units in the heat sealing apparatus 10 are similar in construction and include similar parts identified by similar reference characters. The parts illustrated in cross-section in FIG. 4 and described above are with respect to the eight heated wheels 24 and the eight back-up rollers 28 which are adapted to cooperate in creating the heat seal in the hem that passes over the surface 11b shown in FIG. 4. The sealing unit shown in full line in FIG. 4 includes eight heated wheels 24 and is associated with surface 11a of the wedge 11 and is adapted to cooperate with eight back-up rolls 28 in completing the heat seal in the hem that passes over the surface 11a. As may be seen in FIG. 2, the blocks 31 for each of the shafts for the back-up rollers 28 are staggered and offset to cooperate with the corresponding heated wheels 24 in the two heat sealing units of the heat sealing apparatus 10.

As pointed out above each sealing unit including the heater blocks 20 of the heat sealing apparatus 10 is mounted on the respective support members 17 by the screws 18, FIGS. 1-4. The heat sealing units are adapted to be moved relative to each other and to the web W by a pair of air cylinders 40, one being carried by each of the supporting brackets 17. The air cylinders 40 are secured to the back plate 12 by clevises 41, FIGS. 2-4. When the air cylinders 40 are actuated they are effective to move the supporting brackets 17 along the shafts 14 and thus more the heat sealing units and their respective heated rollers 24 toward or away from their respective backup rollers 28 as shown in FIG. 4. The innermost positions of the heated rollers 24 of the heat sealing units may be adjustably set by means of the screws 42, FIGS. 1 and 2, which are carried by the supporting brackets 17 and are adapted to engage the respective edges of the back plate 12 and act as stops. Thus when the air cylinders 40 are actuated to move the heated rollers 24 of the respective heat sealing units into sealing relationship with the backup rollers 28, the stops 42 will ensure that the heat sealing units are returned to the proper position for cooperation between the heated rollers 24 and the corresponding backup rollers 28 of the two heat sealing units.

As shown in FIG. 1 the web moves in the upward direction of the arrow A. The hems in the web to be sealed first pass over the lower portion of the wedge 11 which is relatively short in length before reaching the heat sealing units where the hem is heat sealed. After leaving the heat sealing units the sealed hems pass over a longer section of the wedge 11 which aids in cooling the heat sealed portions of the hems prior to leaving the wedge 11.

It has been determined by calculation that the creation of a seal 3/16" wide at 300 ft./min. on two layers of 1.3-mil film requires the transfer of 7 Btu/min. of heat into the film. This same amount of heat must likewise be transferred from the heated block into the wheel. This cannot readily be done by hot air or by transfer through the bearings of the wheel. In accordance with the present invention hem seals were made at about 300 ft/min. speed using eight wheels, 1½"diameter, in tandem, heated to a temperature of 300°-350° F. The wheels 24 were hard anodized aluminum having Teflon coated surfaces on the rims 24a and the sides or faces 24b of the wheels which engage the Teflon coated surfaces 20a on the aluminum block 20. The rims 24a had a radius of 3/32". The eight backup wheels were ¾" diameter, 40-durometer natural rollers, although silicone rubber may be preferred for durability. Since two hems are being sealed simultaneously (one for the front and one for the back of the bag) the ¾" backup rolls 28 are alternated and staggered between the hems, FIGS. 3 and 4, so that every other roll 28 is used as the backup for the hot wheels 24 sealing the front of the bag, and alternate rollers 28 are used for backup for the hot wheels 24 sealing the back of the bag. In that way, it is only necessary to separate the hems by about ¾". While a flat anvil backup means may be used in cooperation with the heated rollers, it has been found that the individual rubber rollers provide smoother seals. While the invention has been described with the wedge 11 used in a vertical position, it is to be understood that it is also applicable for use in a horizontal position.

While the present invention has been described in connection with the bag making machine of the type disclosed in the present application, it is to be understood that the hem sealing apparatus embodying the present invention may be utilized in other bag making machines and in other applications for sealing a hem in a moving web of film.

What is claimed is:

1. In a machine for making draw tape bags having front and back panels from thermoplastic film wherein the opposing panels of a moving web of folded film have each of their edges opposite the fold folded over to form a hem comprising two opposing layers of film in each edge to provide a pair of opposing hems for receiving the draw tape, apparatus for heat sealing the respective layers of film in the pair of hems in the moving web of the film comprising:
    structure including a member having a pair of spaced surfaces over which pass the two layers of film of each hem of the pair of hems,
    a first block supported by said structure with respect to one of said surfaces and on one side of one hem of the pair of hems,
    a plurality of rollers mounted on said first block at spaced locations in tandem in the direction of web movement for engaging the outermost layer of film in said one of the hems along a path in the direction of web movement,
    a second block supported by said structure with respect to the other one of the said surfaces and on one side of a second hem of the pair of hems, said second block having a plurality of rollers mounted thereon in spaced locations in tandem in the direction of web movement for engaging the outermost layer of film in said second hem along a path in the direction of web movement,
    means supported by said structure between the pair of hems for engaging the other layer of the film in each of the hems and cooperating with said rollers on said blocks, and
    means for heating each of said blocks and the respective plurality of rollers, each said plurality of rollers being heated and freely rotatable whereby mnovement of the hems through the heat sealing apparatus causes each said plurality of heated rollers mounted on said blocks to rotate and produce the heat seals in the pair of hems.

2. Apparatus according to claim 1 wherein said means supported between said pair of hems comprises a plurality of back-up rollers cooperating with said plurality of heated rollers on said blocks for producing the heat seals in the pair of hems.

3. Apparatus according to claim 1 wherein said back-up rollers are alternated so that every other back-up roller is used as the back-up for the heated rollers sealing the hem on the front of the bag and the alternate back-up rollers are used for the back-up of the heated rollers sealing the hem on the back of the bag to minimize the separation distance between the pair of hems during the heat sealing operation.

4. Apparatus according to claim 1 wherein said structure comprises a back plate having an elongated wedge extending perpendicularly therefrom, said wedge comprising said member and having a front surface and a back surface comprising said pair of spaced surfaces over which the pair of hems pass.

5. Apparatus according to claim 4 wherein said structure includes a pair of shafts having one of their ends secured in spaced relation to said back plate and on the opposite sides of said elongated wedge, said first block being supported from one of said shafts and said second block being supported by the other of said shafts, and air cylinder means for moving said first and second blocks and the plurality of rollers mounted thereon relative to said shafts into and out of heat sealing position with respect to the pair of hems passing over said pair of spaced surfaces.

6. Apparatus according to claim 5 including means for limiting the movement of said heated rollers by said air cylinder means relative to the pair of hems.

* * * * *